(12) United States Patent
Kiyose

(10) Patent No.: US 8,587,790 B2
(45) Date of Patent: Nov. 19, 2013

(54) OPTICAL POSITION DETECTING DEVICE AND APPARATUS PROVIDED WITH POSITION DETECTING FUNCTION

(75) Inventor: Kanechika Kiyose, Matsumoto (JP)

(73) Assignee: Seiko Epson Corporation (JP)

( * ) Notice: Subject to any disclaimer, the term of this patent is extended or adjusted under 35 U.S.C. 154(b) by 111 days.

(21) Appl. No.: 13/246,155

(22) Filed: Sep. 27, 2011

(65) Prior Publication Data

US 2012/0127484 A1  May 24, 2012

(30) Foreign Application Priority Data

Nov. 18, 2010 (JP) ................................ 2010-257565

(51) Int. Cl.
*G01B 11/14* (2006.01)
(52) U.S. Cl.
USPC .......................................... 356/614; 356/622
(58) Field of Classification Search
USPC ........... 356/614–624; 720/685; 362/231, 227, 362/543–549, 555, 800
See application file for complete search history.

(56) References Cited

U.S. PATENT DOCUMENTS

| | | | |
|---|---|---|---|
| 6,883,933 B2 * | 4/2005 | Matsui et al. ................. | 362/231 |
| 6,953,926 B2 | 10/2005 | Reime | |
| 7,475,412 B2 * | 1/2009 | Arai et al. ..................... | 720/685 |
| 8,259,309 B2 * | 9/2012 | Kiyose .......................... | 356/614 |

FOREIGN PATENT DOCUMENTS

| | | |
|---|---|---|
| JP | 2003-534554 | 11/2003 |
| JP | 2009-295318 | 12/2009 |
| JP | 2010-127671 | 6/2010 |

* cited by examiner

*Primary Examiner* — Tri T Ton
(74) *Attorney, Agent, or Firm* — Harness, Dickey & Pierce, P.L.C.

(57) ABSTRACT

In a light source unit of an optical position detecting device, a plurality of light emitting devices are mounted on a band-shaped flexible substrate, and the plurality of light emitting devices emit detection light. The flexible substrate is arranged so as to overlap a convex face of a substrate supporting member, and accordingly, in a case where the flexible substrate is too long, the end portion of the flexible substrate can be inserted into a notch. Therefore, there is no case in which the flexile substrate floats.

14 Claims, 13 Drawing Sheets

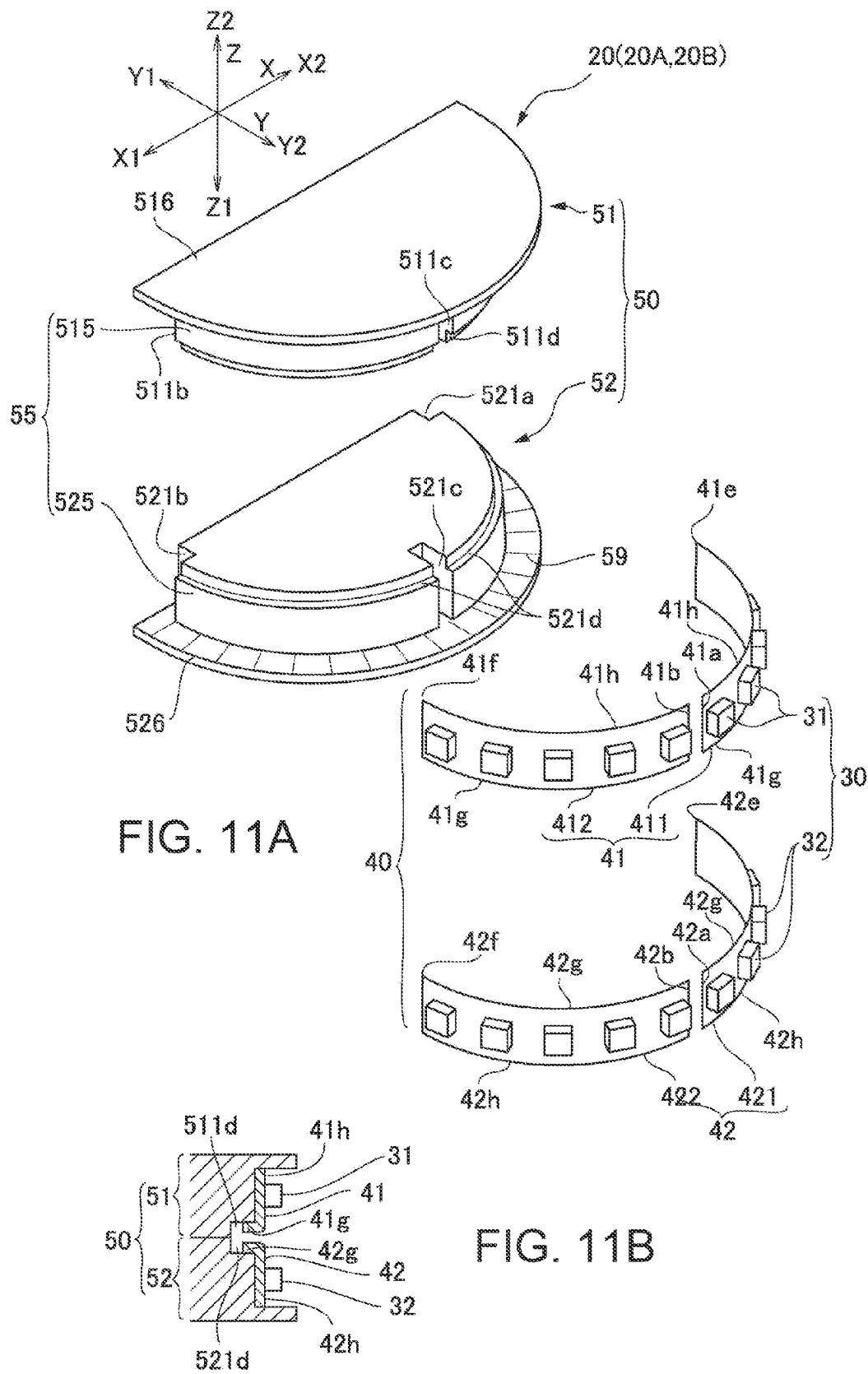

OPTICAL POSITION DETECTING DEVICE AND APPARATUS PROVIDED WITH POSITION DETECTING FUNCTION

BACKGROUND

1. Technical Field

The present invention relates to an optical position detecting device that optically detects the position of a target object and an apparatus provided with a position detecting function that includes the optical position detecting device.

2. Related Art

As an optical position detecting device that optically detects a target object, for example, a device is proposed in which detection light is emitted from a plurality of detection light sources toward the target object through a light transmitting member, and the detection light reflected by the target object is transmitted through the light transmitting member so as to be detected by a light receiving unit. In the optical position detecting device having such a configuration, the position of the target object is detected based on a detection result of the detection light in the light receiving unit (for example, see JP-T-2003-534554).

In addition, a method is also proposed in which a light guiding plate is arranged in an optical position detecting device, detection light emitted from a plurality of detection light sources is output toward a target object through the light guiding plate, and the detection light reflected by the target object is detected by a light receiving unit (see JP-A-2010-127671 and JP-A-2009-295318).

However, the ranges of the optical position detecting devices disclosed in JP-T-2003-534554, JP-A 2010-127671, and JP-A-2009-295318 in which the position of a target object can be detected are narrow. Accordingly, there are many problems to be solved for detecting the position of a target object in a broad area such as a screen face of a projection-type display apparatus, a screen face of an electronic blackboard, digital signage, or the like.

Here, the inventors of the invention propose a method in which a band-shaped flexible substrate having a plurality of light emitting devices mounted thereon is bent so as to position the light emitting devices in different angular directions, and the position of a target object is detected using detection light emitted from the light emitting devices. According to such a configuration, the detection light can be emitted over a wide angle range from the position in which the flexible substrate is arranged, and accordingly, the position of the target object can be detected in a broad area.

However, according to such a method, it takes extensive labor to accurately bend the band-shaped flexible substrate so as to allow the light emitting devices to be positioned in a predetermined direction, and it is difficult to fix the flexible substrate in such a state. Thus, a configuration is considered in which a substrate supporting member having a convex face is prepared, and the flexible substrate is disposed so as to overlap the convex face of the substrate supporting member. However, in a case where the position of the flexible substrate is deviated due to a deviation in the size of the flexible substrate, there is a problem in that it is difficult to detect the position of the target object with high precision due to the deviation in the position of the light emitting devices.

SUMMARY

An advantage of some aspects of the invention is that it provides an optical position detecting device in which light emitting devices can be arranged at predetermined positions in employing a method in which the position of a target object is detected using detection light emitted from a plurality of the light emitting devices mounted on a bent flexible substrate and an apparatus provided with a position detecting function that includes the optical position detecting device.

An aspect of the invention is directed to an optical position detecting device that optically detects a position of a target object. The optical position detecting device includes: a light source unit that emits detection light; a light receiving unit that receives the detection light reflected by the target object that is located in an emission space of the detection light; and a position detecting unit that detects the position of the target object in the emission space based on a result of the reception of the light in the light receiving unit. The light source unit includes a plurality of light emitting devices, a band-shaped flexible substrate on which the plurality of light emitting devices are mounted, and a substrate supporting member that includes a convex face bent in a longitudinal direction on which the flexible substrate is arranged so as to overlap, and a notch, which is concaved from the convex face at a position overlapping an end portion of the flexible substrate and into which the end portion of the flexible substrate is inserted, is disposed in the substrate supporting member.

In the above-described optical position detecting device, the plurality of light emitting devices are mounted on the band-shaped flexible substrate, and the plurality of light emitting devices emit detection light. Accordingly, the position of a target object in the emission space can be detected based on the result of reception of the detection light, which is reflected by a target object located in the emission space of the detection light, in the light receiving unit. Here, since the flexible substrate is arranged so as to overlap the convex face of the substrate supporting member, the flexible substrate is bent in a predetermined shape along the convex face. Accordingly, the detection light can be emitted over a wide angle range from the position in which the flexible substrate is arranged, and therefore, the position of the target object can be detected in a broad area. In addition, since the flexible substrate is bent along the convex face of the substrate supporting member, the great effort for precisely bending the flexible substrate is not necessary, and the flexible substrate can be maintained in a bent shape in an easy manner. Furthermore, in the substrate supporting member, a notch is formed at a position overlapping the end portion of the flexible substrate. Accordingly, when one end portion of the flexible substrate is positioned, the other end portion can be inserted into the notch. Therefore, even in a case where the size of the flexible substrate is too large, the flexible substrates can be arranged so as to overlap the convex face of the substrate supporting member, and whereby there is no floating of the flexible substrates. Accordingly, the plurality of light emitting devices can be precisely arranged so as to face in a predetermined direction. As a result, the plurality of light emitting devices can emit the detection light in a predetermined direction, whereby the position of the target object can be detected with high precision.

The above-described optical position detecting device may be configured such that an emission intensity monotonously changes from one end of the convex face in the longitudinal direction toward the other end side when the detection light is emitted from the light source units. In such a configuration, a light intensity distribution can be formed in the emission space of the detection light, and accordingly, the position of the target object can be detected by using the intensity distribution. Even in such a configuration, since the plurality of light emitting devices are arranged so as to precisely face in a predetermined direction, a predetermined light intensity distribution can be formed in the emission space of the detection light. Therefore, the position of the target object can be detected with high precision.

The above-described optical position detecting device may be configured such that a band-shaped first flexible substrate and a band-shaped second flexible substrate that is arranged in parallel with the first flexible substrate in a width direction of the first flexible substrate are included as the flexible substrate, the plurality of light emitting devices mounted on the first flexible substrate and the plurality of light emitting devices mounted on the second flexible substrate are turned on at different timings, the emission intensity increases from the one end of the convex face in the longitudinal direction toward the other end side in the plurality of light emitting devices mounted on the first flexible substrate, and the emission intensity decreases from the one end of the convex face in the longitudinal direction toward the other end side in the plurality of light emitting devices mounted on the second flexible substrate. In such a configuration, a first light intensity distribution formed by the plurality of light emitting devices mounted on the first flexible substrate and a second light intensity distribution formed by the plurality of light emitting devices mounted on the second flexible substrate are formed such that the intensities of the detection light thereof change in opposite directions. Accordingly, the position of the target object can be detected based on the result of reception of light in the light receiving unit at the time of forming the first light intensity distribution and the result of reception of light in the light receiving unit at the time of forming the second light intensity distribution. Even in such a configuration, the plurality of light emitting devices are arranged so as to precisely face in a predetermined direction, and accordingly a predetermined light intensity distribution can be formed in the emission space of the detection light. Therefore, the position of the target object can be detected with high precision.

In the above-described optical position detecting device, it is preferable that the notch is concaved from the convex face at a position overlapping the end portion of the flexible substrate in a longitudinal direction and into which the end portion of the flexible substrate in the longitudinal direction is inserted. In such a configuration, even in a case where the length of the flexible substrate is too large, the flexible substrate can be arranged so as to overlap the convex face of the substrate supporting member, and whereby there is no floating of the flexible substrate.

In such a case, the optical position detecting device may be configured such that the notch is disposed in the end portion of the convex face in the longitudinal direction.

In addition, in case where the optical position detecting device is configured such that a plurality of the flexible substrates are arranged in series in the longitudinal direction of the convex face, the notch may be disposed at a position in the middle of the convex face in the longitudinal direction.

The above-described optical position detecting device may be configured such that the notch is concaved from the convex face at a position overlapping an one end portion of the flexible substrate in a width direction and into which the one end portion of the flexible substrate is inserted. In such a configuration, even in a case where the width of the flexible substrate is too large, the flexible substrate can be arranged so as to overlap the convex face of the substrate supporting member, and whereby there is no floating of the flexible substrate.

In such a case, it is preferable that a flange portion, which protrudes from the convex face and with which the other end portion of the flexible substrate in a width direction is brought into contact, is disposed in the substrate supporting member. In such a configuration, the flexible substrate can be arranged at a predetermined position in the width direction by bringing the other end portion of the flexible substrate in the width direction and the flange portion into contact with each other.

An optical position detecting device to which the invention is applied can be used in various apparatuses provided with a position detecting function such as a screen face of a projection-type display apparatus, a screen face of an electronic blackboard, digital signage, a show window, and an amusement apparatuses.

BRIEF DESCRIPTION OF THE DRAWINGS

The invention will be described with reference to the accompanying drawings, wherein like numbers reference like elements.

FIGS. 11A and 11B are explanatory diagrams illustrating a detailed configuration of the light source unit of the optical position detecting device according to Embodiment 3 of the invention.

DESCRIPTION OF EXEMPLARY EMBODIMENTS

Figure 1:
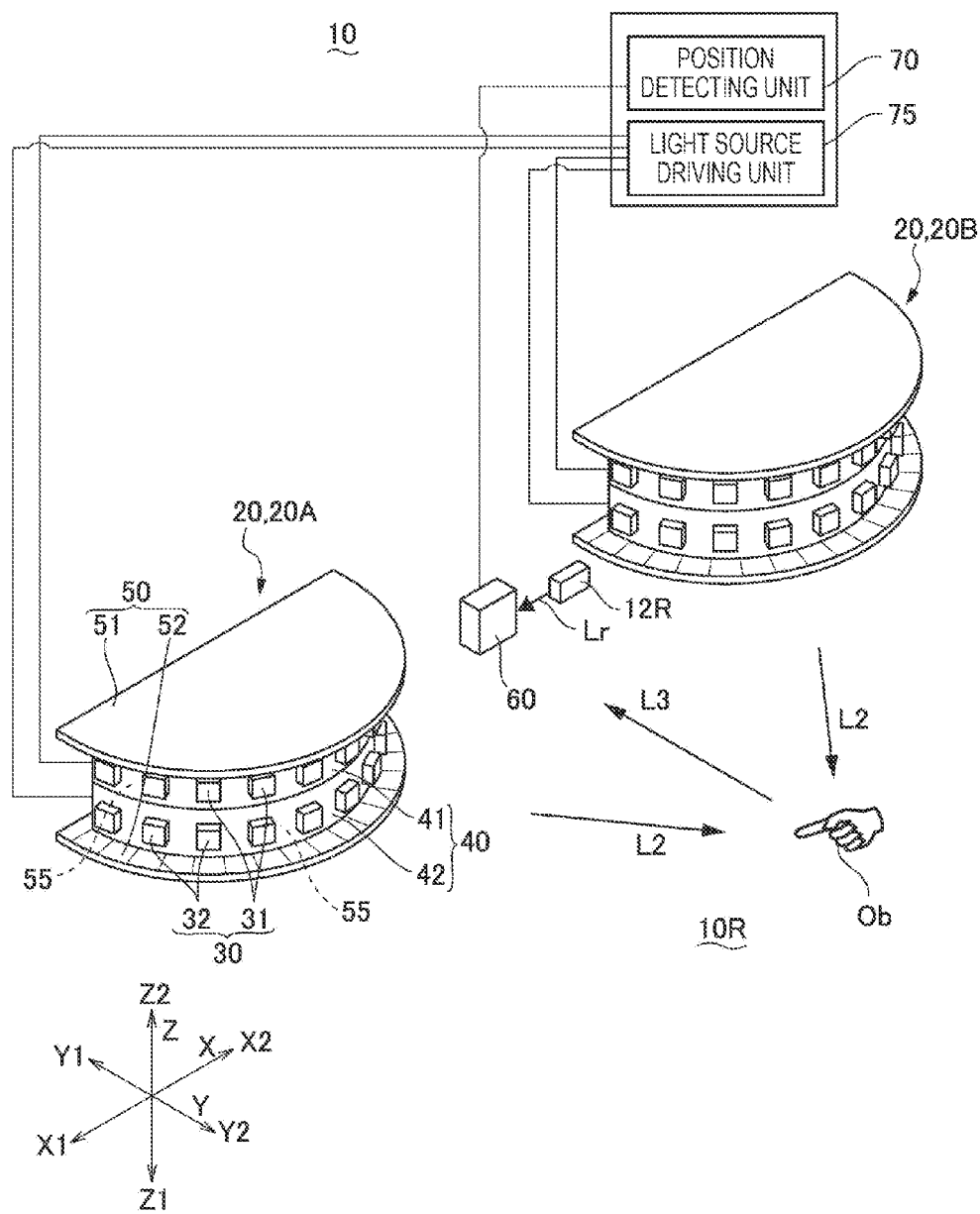
FIG. 1 is an explanatory diagram schematically illustrating the entire configuration of an optical position detecting device according to Embodiment 1 of the invention.

Next, embodiments of the invention will be described in detail with reference to the accompanying drawings. In the description presented below, axes perpendicular to each other are described as an X axis and a Y axis, and an axis that is perpendicular to the X axis and the Y axis is described as a Z axis. In addition, in the drawings to be referred to hereinafter, one side in the X axis direction is denoted as the X1 side, the other side in the X axis direction is denoted as the X2 side, one side in the Y axis direction is denoted as the Y1 side, the other side in the Y axis direction is denoted as the Y2 side, one side in the Z axis direction is denoted as the Z1 side, and the other side in the Z axis direction is denoted as the Z2 side.

Embodiment 1
Entire Configuration

FIG. 1 is an explanatory diagram schematically illustrating the entire configuration of an optical position detecting device according to Embodiment 1 of the invention.

In FIG. 1, the optical position detecting device 10 according to this embodiment is a device that detects the position (X coordinate) of a target object Ob located in a detection target space 10R in the X direction and the position (Y coordinate) of the target object Ob in the Y direction. The optical position detecting device 10 includes a light source unit 20 that emits detection light L2 and a light receiving unit 60 that receives detection light L3 reflected by the target object Ob located in the emission space (a detection target space 10R) of the detection light L2. In addition, the optical position detecting device 10 includes a light source driving unit 75 that is used for driving the light source unit 20 and a position detecting unit 70 that detects the position (the X coordinate and the Y coordinate) of the target object Ob in the detection target space 10R based on the result of light reception in the light receiving unit 60.

In this embodiment, the light source unit 20 is configured by a first light source unit 20A that is located on one side X1 in the X axis direction and a second light source unit 20B that is located on the other side X2 in the X axis direction. The first light source unit 20A and the second light source unit 20B are located at the same position in the Y axis direction and the Z axis direction.

Detailed Configuration of Light Source Unit

Figure 2A:
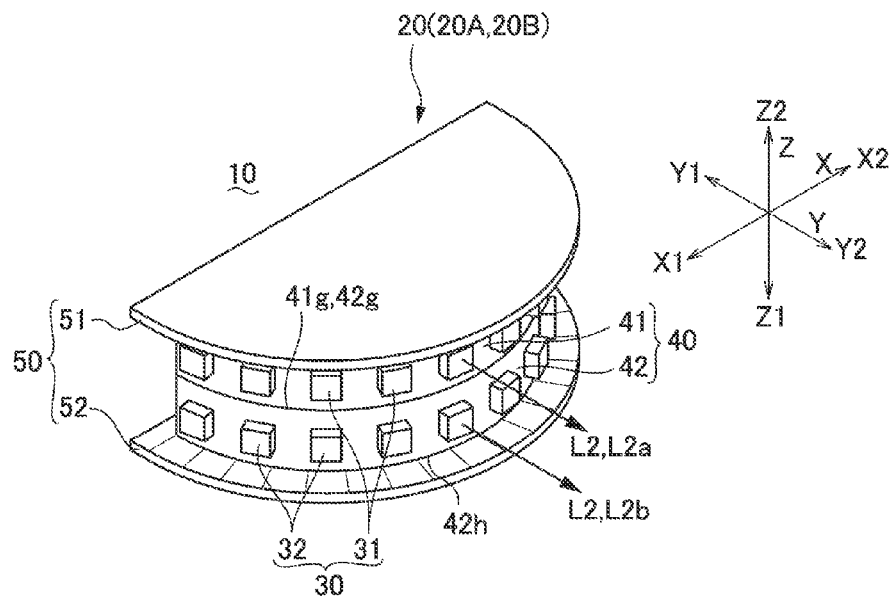
FIGS. 2A and 2B are explanatory diagrams of a light source unit of the optical position detecting device according to Embodiment 1 of the invention.
Figure 2B:
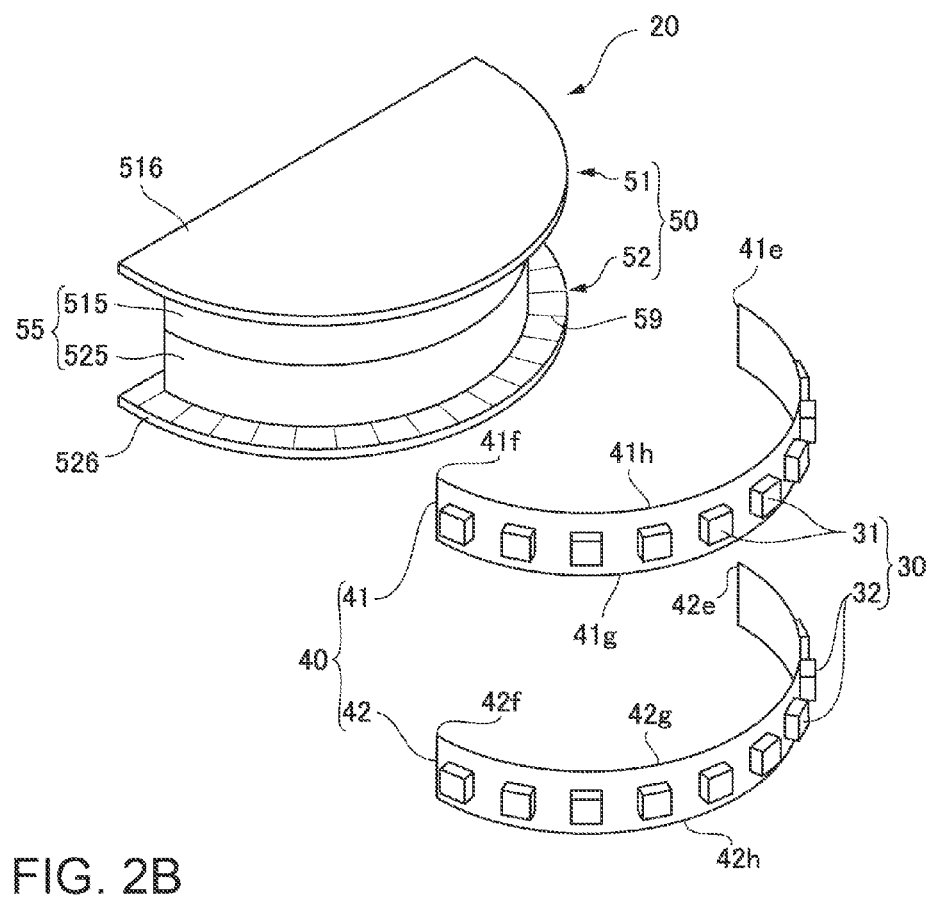
Figure 3:
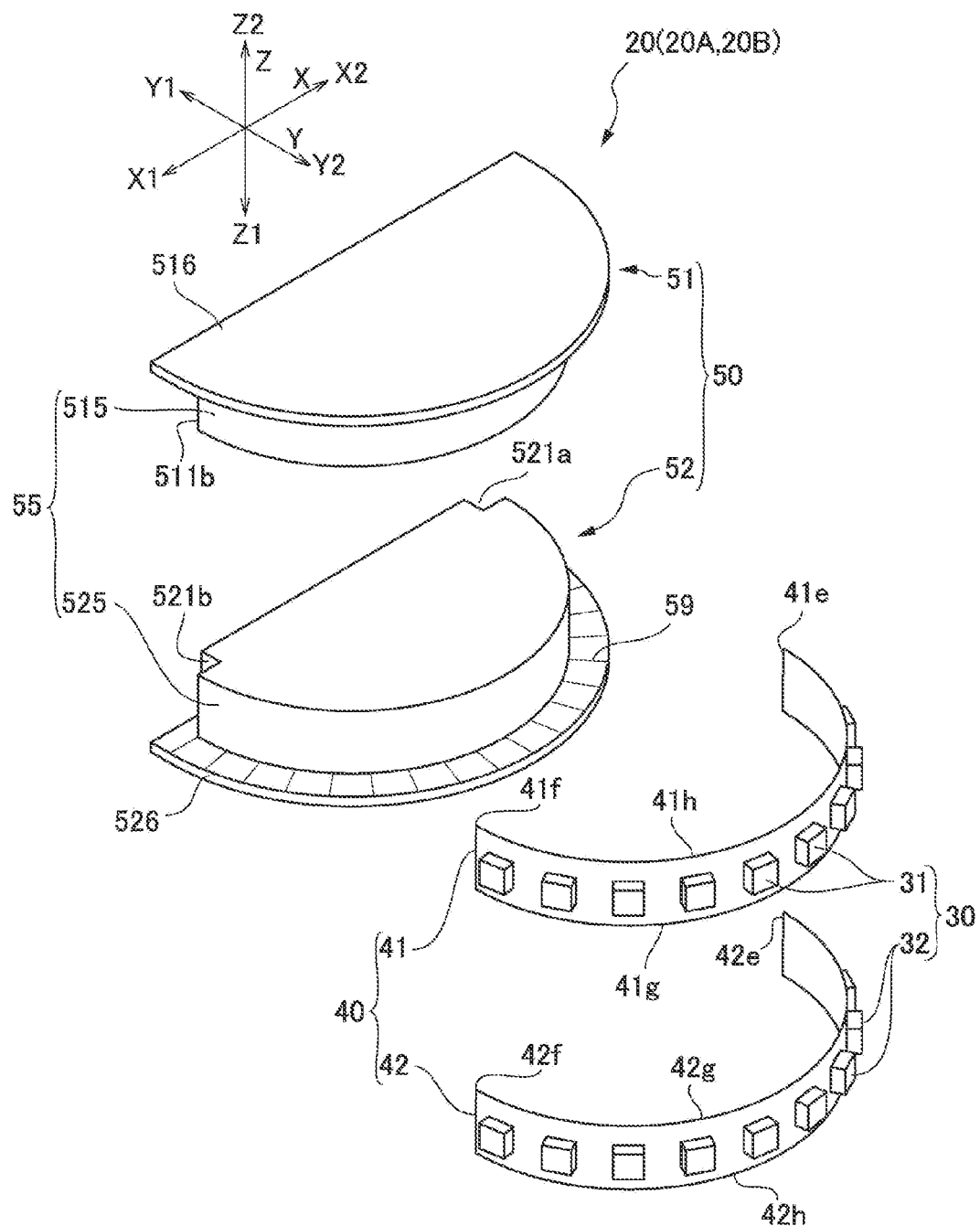
FIG. 3 is an exploded perspective view acquired by disassembling the light source unit of the optical position detecting device according to Embodiment 1 of the invention into pieces.
Figure 4A:
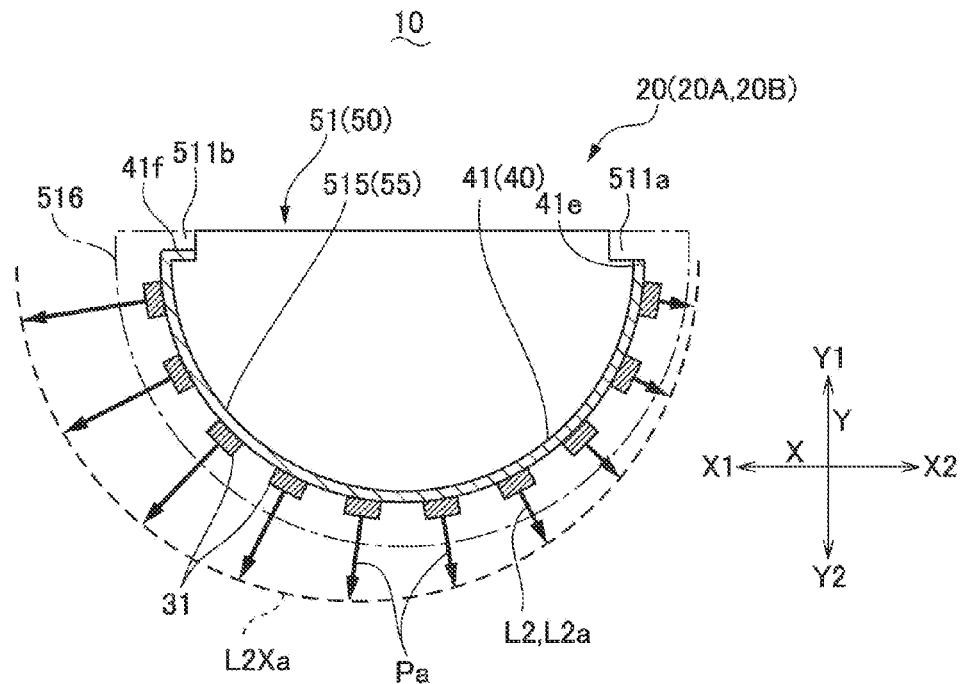
FIGS. 4A and 4B are explanatory diagrams illustrating the appearance acquired by disassembling the light source unit of the optical position detecting device according to Embodiment 1 of the invention vertically.
Figure 4B:
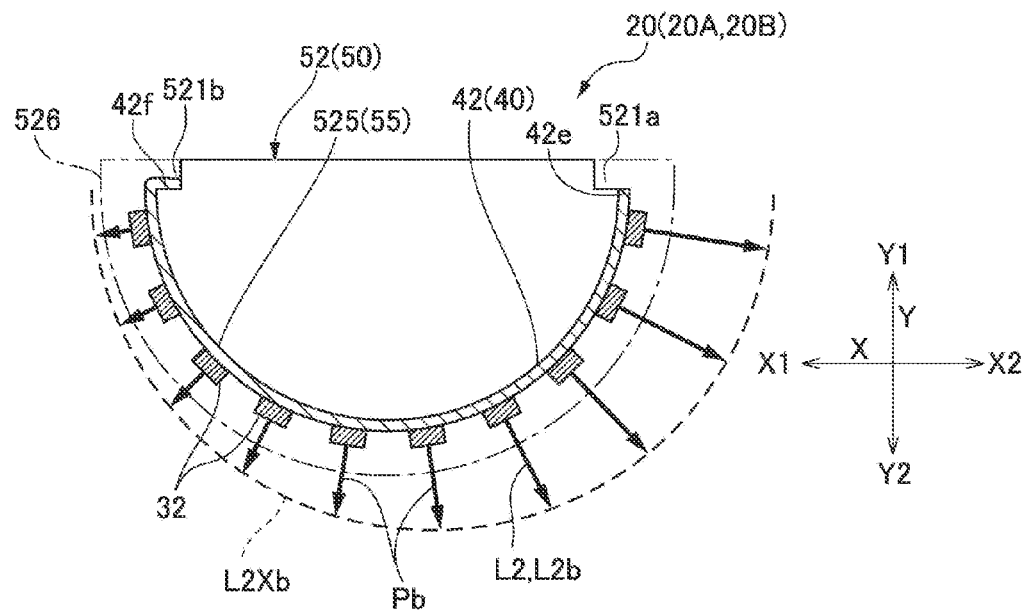

FIGS. 2A and 2B are explanatory diagrams of the light source unit 20 of the optical position detecting device 10 according to Embodiment 1 of the invention. FIGS. 2A and 2B are a perspective view and an exploded perspective view of the light source unit 20. FIG. 3 is an exploded perspective view acquired by disassembling the light source unit 20 of the optical position detecting device 10 according to Embodiment 1 of the invention into pieces. FIGS. 4A and 4B are explanatory diagrams illustrating the appearance acquired by vertically disassembling the light source unit 20 of the optical position detecting device 10 according to Embodiment 1 of the invention. FIGS. 4A and 4B are an explanatory diagram showing the planar configuration of an upper half portion of the light source unit 20 and the planar configuration of a lower half portion of the light source unit 20. In FIG. 4A, the entire portion is covered with a flange portion, the flange portion is denoted by a dashed-dotted line, and a portion covered with the flange portion is denoted by a solid line.

Two light source units 20 (the first light source unit 20A and the second light source unit 20B) shown in FIG. 1 have the same basic configuration. Each of the two light source units 20 (the first light source unit 20A and the second light source unit 20B) includes: a plurality of light emitting devices 30; a band-shaped flexible substrate 40 on which the plurality of light emitting devices 30 are mounted; and a substrate supporting member 50 that includes a convex face 55 having a curved shape and extending in the longitudinal direction (the circumferential direction). In this embodiment, the convex face 55 has a shape that is bent in a half circle shape in the longitudinal direction (the circumferential direction).

As shown in FIGS. 1, 2A, 2B, 3, 4A, and 4B, in this embodiment, as the flexible substrate 40, a band-shaped first flexible substrate 41 and a band-shaped second flexible substrate 42 that is in parallel with the first flexible substrate 41 in the width direction are used. In this state, the first flexible substrate 41 and the second flexible substrate 42 have one end portions 41g and 42g in the width direction to be adjacent to each other and the other end portions 41h and 42h to be located on the sides opposite to each other.

On the first flexible substrate 41, a plurality of first light emitting devices 31 as the plurality of light emitting devices 30 are mounted in the longitudinal direction. In addition, on the second flexible substrate 42, a plurality of second light emitting devices 32 as the plurality of light emitting devices 30 are mounted in the longitudinal direction. Each light emitting device 30 (each one of the first light emitting device 31 and the second light emitting device 32) is configured by an LED (light emitting diode) or the like. In this embodiment, the light emitting device 30 emits the detection light L2 (the detection light L2a and L2b) that is formed by infrared light having a peak wavelength of 840 to 1000 nm as emissive light. In this embodiment, since the target object Ob is a fingertip or the like in many cases, infrared light (near-infrared light of about 840 to 920 nm) of a wavelength region for which the reflectivity of the target object Ob (human body) is high is used as the detection light L2.

The substrate supporting member 50 has a structure in which a first substrate supporting member 51 and a second substrate supporting member 52 overlap each other in the Z axis direction. The first substrate supporting member 51 and the second substrate supporting member 52 are configured to as to be symmetrical in the Z axis direction. The first substrate supporting member 51 includes a convex face 515 having a semicircular shape that configures an upper portion of the convex face 55 and a semicircular flange portion 516 that protrudes from the convex face 515 in the end portion of the convex face 515 that is located on the side opposite to a side on which the second substrate supporting member 52 is located, and the first flexible substrate 41 is arranged so as to overlap the convex face 515. In this embodiment, the other end portion 41h of the first flexible substrate 41 is brought into contact with the flange portion 516, and the position of the first flexible substrate 41 in the width direction is regulated. The second substrate supporting member 52 includes a convex face 525 having a semicircular shape that configures a lower portion of the convex face 55 and a semicircular flange portion 526 that protrudes from the convex face 525 in the end portion of the convex face 525 that is located on the side opposite to a side on which the first substrate supporting member 51 is located, and the second flexible substrate 42 is arranged so as to overlap the convex face 525. In this embodiment, the other end portion 42h of the second flexible substrate 42 is brought into contact with the flange portion 526, and the position of the second flexible substrate 42 in the width direction is regulated. In the flange portions 516 and 526, indices 59 representing the angular directions are formed at equal angular intervals.

As shown in FIGS. 4A and 4B, in the first substrate supporting member 51, notches 511a and 511b are formed on both end portions of the convex face 515 in the circumferential direction, and as a result, the angle range in which the convex face 515 is formed is narrower than the angle range in which the flange portion 516 is formed. In the second substrate supporting member 52, similarly to the first substrate supporting member 51, notches 521a and 521b are formed on both end portions of the convex face 525 in the circumferential direction, and as a result, the angle range in which the convex face 525 is formed is narrower than the angle range in which the flange portion 526 is formed. The notches 511a, 511b, 521a, and 521b will be described later.

The light receiving unit 60 shown in FIG. 1 is formed from a photodiode, a phototransistor, or the like that faces the light receiving surface in the detection target space 10R. In this embodiment, the light receiving unit 60 is a photodiode having a sensitivity peak in the infrared region. In this embodiment, the light receiving unit 60 is arranged at an approximately center position of the first light source unit 20A and the second light source unit 20B in the X axis direction, and the first light source unit 20A and the second light source unit 20B are arranged at an approximately same position as the light receiving unit 60 in the Y axis direction and the Z axis direction.

In addition, the optical position detecting device 10 may include a reference light source 12R facing the light emitting unit in the light receiving unit 60. The reference light source 12R, similarly to the light emitting device 30, is configured by a light emitting device such as an LED (light emitting diode), and the reference light source 12R emits reference light Lr formed from infrared light having a peak wavelength of 840 to 1000 nm as emissive light. However, the reference light Lr emitted from the reference light source 12R is configured to be incident to the light receiving unit 60 without being incident to the detection target space 10R based on the direction of the reference light source 12R, a light shielding cover (not shown) disposed in the reference light source 12R, and the like.

Position Detecting Method

Figure 5A:
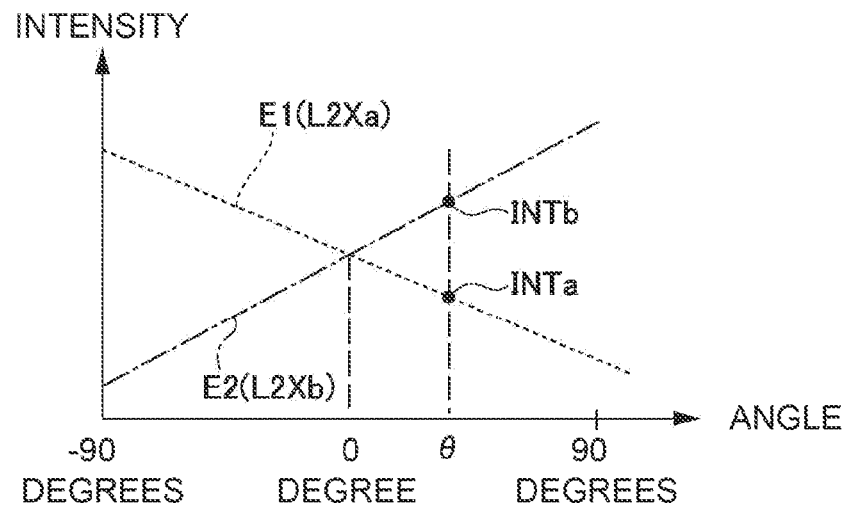
FIGS. 5A and 5B are explanatory diagrams illustrating the position detecting principle of the optical position detecting device according to Embodiment 1 of the invention.
Figure 5B:
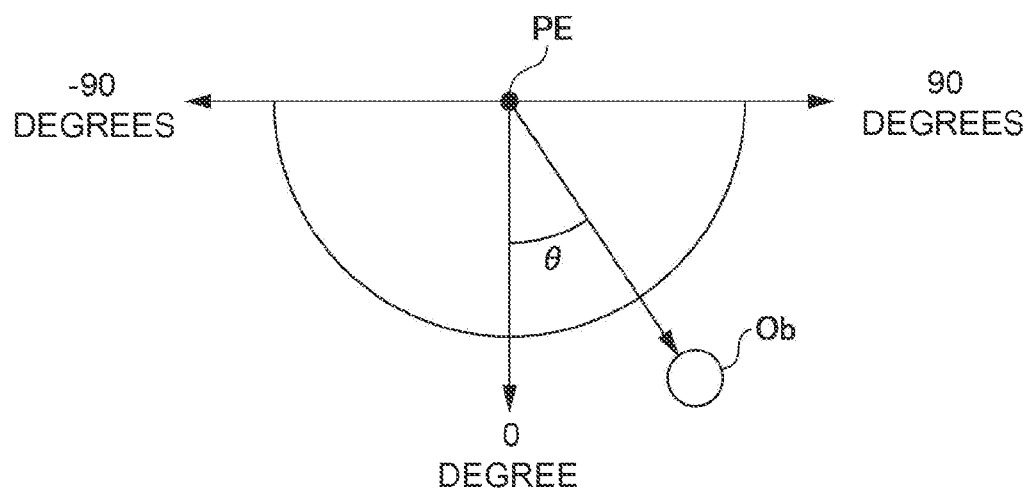
Figure 6:
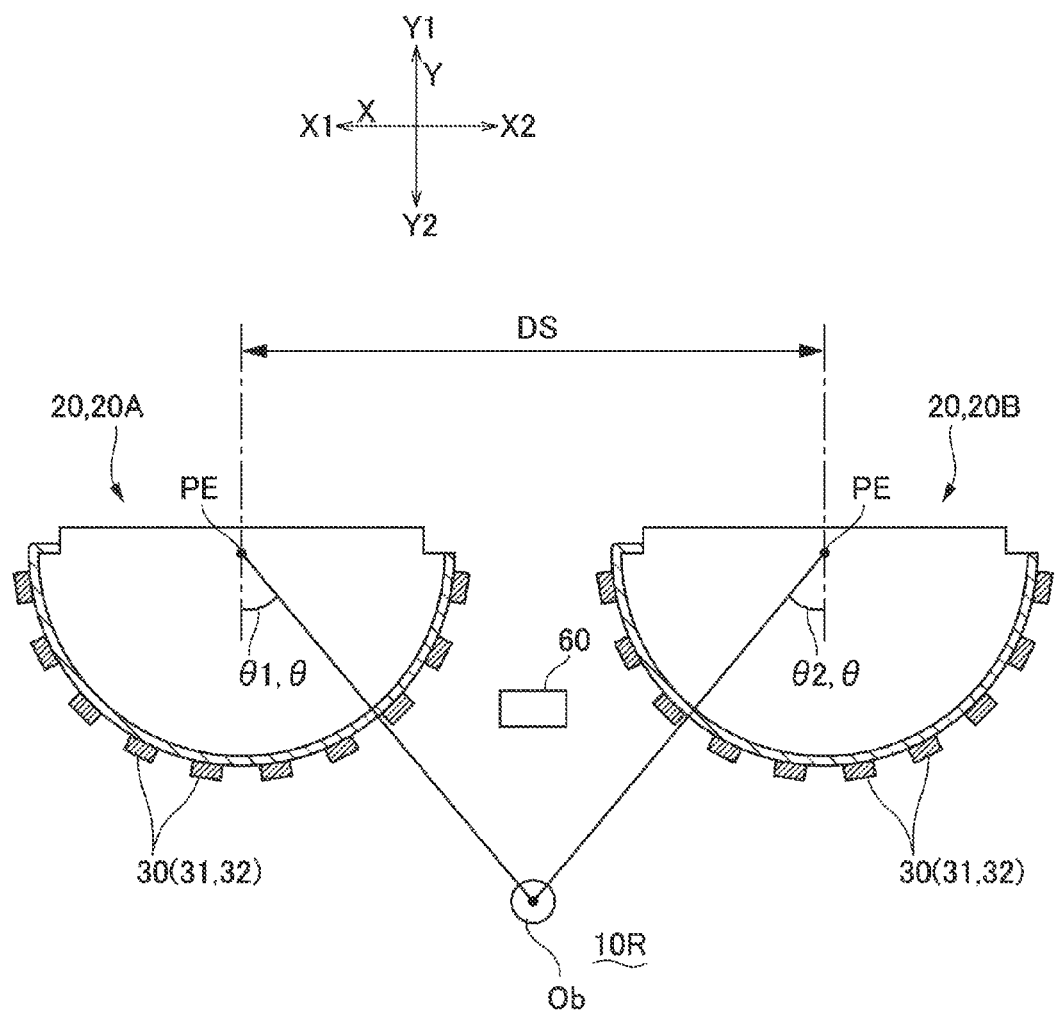
FIG. 6 is an explanatory diagram illustrating a method of specifying the position of a target object in the optical position detecting device according to Embodiment 1 of the invention.

FIGS. 5A and 5B are explanatory diagrams illustrating the position detecting principle of the optical position detecting device 10 according to Embodiment 1 of the invention. FIGS. 5A and 5B are an explanatory diagram of a light intensity distribution and an explanatory diagram illustrating a method of acquiring position information (azimuth information) on the position at which a target object is present. FIG. 6 is an explanatory diagram illustrating a method of specifying the position of a target object Ob in the optical position detecting device 10 according to Embodiment 1 of the invention.

In the optical position detecting device 10 according to this embodiment, in order to detect the position of a target object Ob in the detection target space 10R, the detection light L2 is emitted from the light source unit 20. At that time, the light source driving unit 75 shown in FIG. 1 drives the light emitting device 30 such that the emission intensity monotonously changes from one end of the flexible substrate 40 toward the other end side. In addition, the plurality of first light emitting devices 31 mounted on the first flexible substrate 41 and the plurality of second light emitting devices 32 mounted on the second flexible substrate 42 are turned on at different timing, and the plurality of first light emitting devices 31 mounted on the first flexible substrate 41 and the plurality of second light emitting devices 32 mounted on the second flexible substrate 42 emit the detection light L2 of which the intensities monotonously change in the opposite directions.

More specifically, during a first period in which all the plurality of first light emitting devices 31 are turned on, and all the second light emitting devices 32 are turned off, as the magnitude of the emission intensity is represented by arrows Pa in FIG. 4A, the emission intensity of the first light emitting device 31 is increased from one end portion 41e of the first flexible substrate 41 in the longitudinal direction toward the other end portion 41f. Accordingly, during the first period, in a first light intensity distribution L2Xa of the detection light L2 emitted from the light source unit 20 into the detection target space 10R, the light intensity in the angular direction in which one end portion 41e of the first flexible substrate 41 in the longitudinal direction is the lowest, and the light intensity continuously increases therefrom toward the angular direction in which the other end portion 41f is located.

On the other hand, during a second period in which all the plurality of the second light emitting devices 32 are turned on, and all the first light emitting devices 31 are turned off, as the magnitude of the emission intensity is represented by arrows Pb in FIG. 4B, the emission intensity of the second light emitting device 32 is decreased from one end portion 42e of the second flexible substrate 42 (a side on which one end portion 41e of the first flexible substrate 41 is located) in the longitudinal direction toward the other end portion 42f (a side on which the other end portion 41f of the first flexible substrate 41 is located). Accordingly, during the second period, in a second light intensity distribution L2Xb of the detection light L2 emitted from the light source unit 20 into the detection target space 10R, the light intensity in the angular direction in which one end portion 42e of the second flexible substrate 42 in the longitudinal direction is located is highest, and the light intensity continuously decreases therefrom toward the angular direction in which the other end portion 42f is located.

In performing such a driving operation, other than the configuration in which the light source driving unit 75 supplies a predetermined driving current to the plurality of the light emitting devices 30, a configuration may be employed in which the light emitting devices 30 are electrically connected in parallel with the flexible substrate 40, and the value of the current supplied to each of the plurality of the light emitting devices 30 is limited through a resistor.

In this embodiment, as described below, the position of a target object Ob is detected by using the first light intensity distribution L2Xa and the second light intensity distribution L2Xb.

First, when the first light intensity distribution L2Xa is formed by the first light source unit 20A, the irradiation direction (angular direction) of the detection light L2 and the intensity of the detection light L2 have a linear relationship that is denoted by a line E1 shown in FIG. 5A. In addition, when the second light intensity distribution L2Xb is formed by the first light source unit 20A, the irradiation direction (angular direction) of the detection light L2 and the intensity of the detection light L2 have a linear relationship that is denoted by a line E2 shown in FIG. 5A.

Here, as shown in FIGS. 5B and 6, it is assumed that a target object Ob is present in a direction of an angle θ when viewed from the center PE of the first light source unit 20A. In such a case, during the first period in which the first light intensity distribution L2Xa is formed, the intensity of the detection light L2 at a position at which the target object Ob is present is an intensity INTa. In contrast to this, during the second period in which the second light intensity distribution L2Xb is formed, the intensity of the detection light L2 at a position at which the target object Ob is present is an intensity INTb. Accordingly, by acquiring the relationship between the intensities INTa and INTb by comparing the detection intensity in the light receiving unit 60 at the time of forming the first light intensity distribution L2Xa and a detection intensity in the light receiving unit 60 at the time of forming the second light intensity distribution L2Xb, the angle θ (angle θ1) of the direction in which the target object Ob is located with respect to the center PE of the first light source unit 20A used as a reference can be acquired.

By acquiring the angle θ (angle θ2) of the direction in which the target object Ob is located by performing such an operation also for the second light source unit 20B, the position of the target object Ob with respect to the centers PE of the first light source unit 20A and the second light source unit 20B as references can be specified. In addition, since a distance DS between the center PE of the first light source unit 20A and the center PE of the second light source unit 20B is fixed, the position detecting unit 70 shown in FIG. 1 can calculate the X coordinate and the Y coordinate of the target object Ob. In acquiring the position information of the target object Ob inside the detection target space 10R based on the detection result acquired in the light receiving unit 60 as above, for example, a configuration may be employed in which the process is performed by executing predetermined software (an operation program) by using a microprocessor unit (MPU) as the position detecting unit 70. In addition, a configuration may be employed in which hardware such as a logic circuit is used for the position detecting unit 70.

Furthermore, in the light source unit 20 (the first light source unit 20A and the second light source unit 20B), the angle θ (angles θ1 and θ2) of the direction in which the target object Ob is located may be acquired based on driving currents when the first light emitting device 31 and the second light emitting device 32 are driven such that the detection intensity acquired in the light receiving unit 60 at the time of forming the first light intensity distribution L2Xa by using the first light emitting device 31 and the detection intensity acquired in the light receiving unit 60 at the time of forming the second light intensity distribution L2Xb by using the second light emitting device 32 are the same or the ratio, a difference, or the like between the driving currents when the driving currents are adjusted. In addition, in a case where the reference light source 12R shown in FIG. 1 is arranged, the angle θ (angles θ1 and θ2) of the direction in which the target object Ob is located may be acquired by using a result of comparison between the detection intensity acquired in the light receiving unit 60 at the time of forming the first light intensity distribution L2Xa and the detection intensity of the reference light Lr emitted from the reference light source 12R acquired in the light receiving unit 60 or a result of comparison between the detection intensity acquired in the light receiving unit 60 at the time of forming the second light intensity distribution L2Xb and the detection intensity of the reference light Lr emitted from the reference light source 12R that is acquired in the light receiving unit 60.

Determining Position of Flexible Substrate 40

Since the optical position detecting device 10 according to this embodiment detects the position of a target object Ob by using the above-described method, the position and the direction of the light emitting device 30 are required to have high precision. Thus, in this embodiment, the first flexible substrate 41 is arranged in the first substrate supporting member 51 by using the notches 511a and 511b formed in both end portions of the convex face 515 in the circumferential direction thereof, and the second flexible substrate 42 is arranged in the second substrate supporting member 52 by using the notches 521a and 521b formed in both end portions of the convex face 525 in the circumferential direction thereof.

More specifically, when the first flexible substrate 41 is arranged on the convex face 515 of the first substrate supporting member 51, as shown in FIG. 4A, one end portion 41e of the first flexible substrate 41 is positioned in a boundary portion between the end portion of the convex face 515 of the first substrate supporting member 51 and the notch 511a, then, the first flexible substrate 41 is arranged so as to overlap the convex face 515, and the first flexible substrate 41 and the convex face 515 are fixed by using an adhesive agent or the like. In this state, the other end portion 41h of the first flexible substrate 41 is brought into contact with the flange portion 516, and accordingly, the first flexible substrate 41 is positioned in the width direction with high precision. Here, in a case where the length of the first flexible substrate 41 is much larger than the length of the convex face 515, the other end portion 41f of the first flexible substrate 41 is bent so as to be inserted into the notch 511b. Accordingly, differently from a case where one end portion 41e and the other end portion 41f of the first flexible substrate 41 are positioned to the convex face 515, inconvenience such as partial floating of the first flexible substrate 41 from the convex face 515 does not occur.

More specifically, as shown in FIG. 4B, when one end portion 42e of the second flexible substrate 42 is positioned in a boundary portion between the end portion of the convex face 525 of the second substrate supporting member 52 and the notch 521a, then, the second flexible substrate 42 is arranged so as to overlap the convex face 525, and the second flexible substrate 42 and the convex face 525 are fixed by using an adhesive agent or the like. In this state, the other end portion 42h of the second flexible substrate 42 is brought into contact with the flange portion 526, and accordingly, the second flexible substrate 42 is positioned in the width direction with high precision. Here, in a case where the length of the second flexible substrate 42 is much larger than the length of the convex face 525, the other end portion 42f of the second flexible substrate 42 is bent so as to be inserted into the notch 521b. Accordingly, differently from a case where one end portion 42e and the other end portion 42f of the second flexible substrate 42 are positioned on the convex face 525, inconvenience such as partial floating of the second flexible substrate 42 from the convex face 525 does not occur.

Main Advantages of this Embodiment

As described above, in the optical position detecting device 10 according to this embodiment, a plurality of the light emitting devices 30 are mounted on the band-shaped flexible substrate 40, and the plurality of the light emitting devices 30 emit the detection light L2. Accordingly, the position of a target object Ob in the emission space can be detected based on a result of reception of the detection light L2 reflected by the target object Ob located in the emission space of the detection light L2 in the light receiving unit 60. Here, since the flexible substrate 40 is arranged so as to overlap the convex face 55 of the substrate supporting member 50, the flexible substrate 40 is bent in a predetermined shape along the convex face 55. Accordingly, the detection light L2 can be emitted over a wide angular range from the position at which the flexible substrate 40 is arranged, and therefore, the position of the target object Ob can be detected in a broad area. In addition, since the flexible substrate 40 is bent along the convex face 55 of the substrate supporting member 50, the great effort for precisely bending the flexible substrate 40 is not necessary, and the flexible substrate 40 can be maintained in a bent shape in an easy manner.

In addition, in the substrate supporting member 50, notches (the notch 511b of the first substrate supporting member 51 and the notch 521b of the second substrate supporting member 52) are formed at positions overlapping the other end portions (the other end portion 41f of the first flexible substrate 41 and the other end portion 42f of the second flexible substrate 42) of the flexible substrates 40. Accordingly, when one end portions (one end portion 41e of the first flexible substrate 41 and one end portion 42e of the second flexible substrate 42) of the flexible substrates 40 are positioned, the other end portions (the other end portion 41f of the first flexible substrate 41 and the other end portion 42f of the second flexible substrate 42) can be inserted into the notches 511b and 521b. Therefore, even in a case where the sizes of the flexible substrates 40 are too large, the flexible substrates 40 can be arranged so as to overlap the convex face 55 of the substrate supporting member 50, and whereby there is no floating of the flexible substrates 40. Accordingly, the plurality of the light emitting devices 30 can be precisely arranged so as to face in a predetermined direction toward a predetermined direction. As a result, the plurality of the light emitting devices 30 can emit the detection light L2 in a predetermined direction, whereby the position of the target object Ob can be detected with high precision.

Particularly, as in this embodiment, in a case where a method is used in which the emission intensity is formed by allowing the emission intensities of the plurality of the light emitting devices 30 to be different from each other, high precision is necessary for the positions and the directions of the plurality of the light emitting devices 30. However, according to this embodiment, a difference between the sizes of the flexible substrates 40 can be absorbed using the notches 511b and 521b, and accordingly, the flexible substrates 40 can appropriately arranged. As a result, high precision can be acquired for the positions and the directions of the plurality of the light emitting devices 30, whereby the position of the target object Ob can be detected with high precision.

Embodiment 2

Figure 7A:
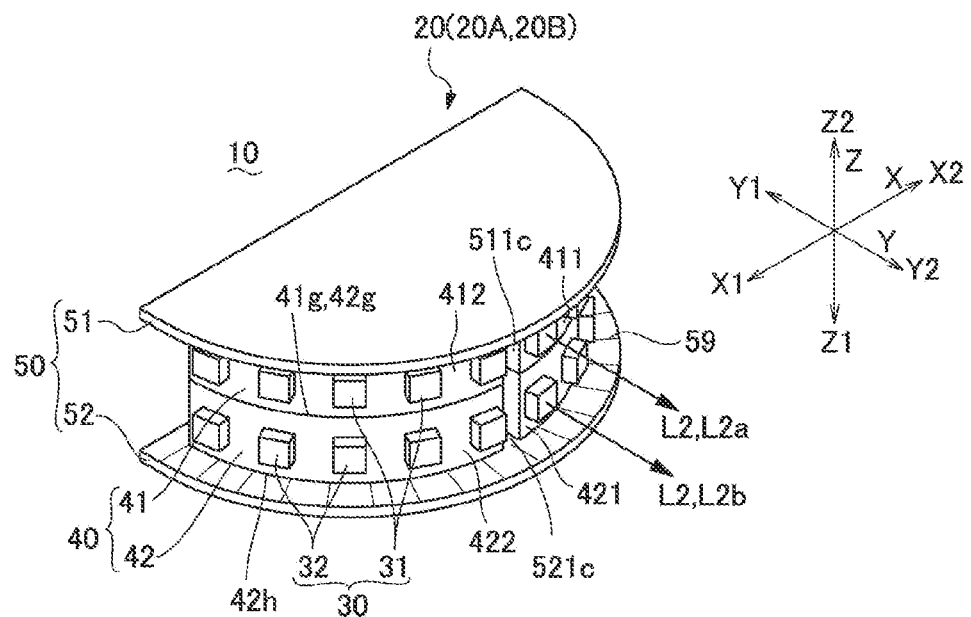
FIGS. 7A and 7B are explanatory diagrams of a light source unit of an optical position detecting device according to Embodiment 2 of the invention.
Figure 7B:
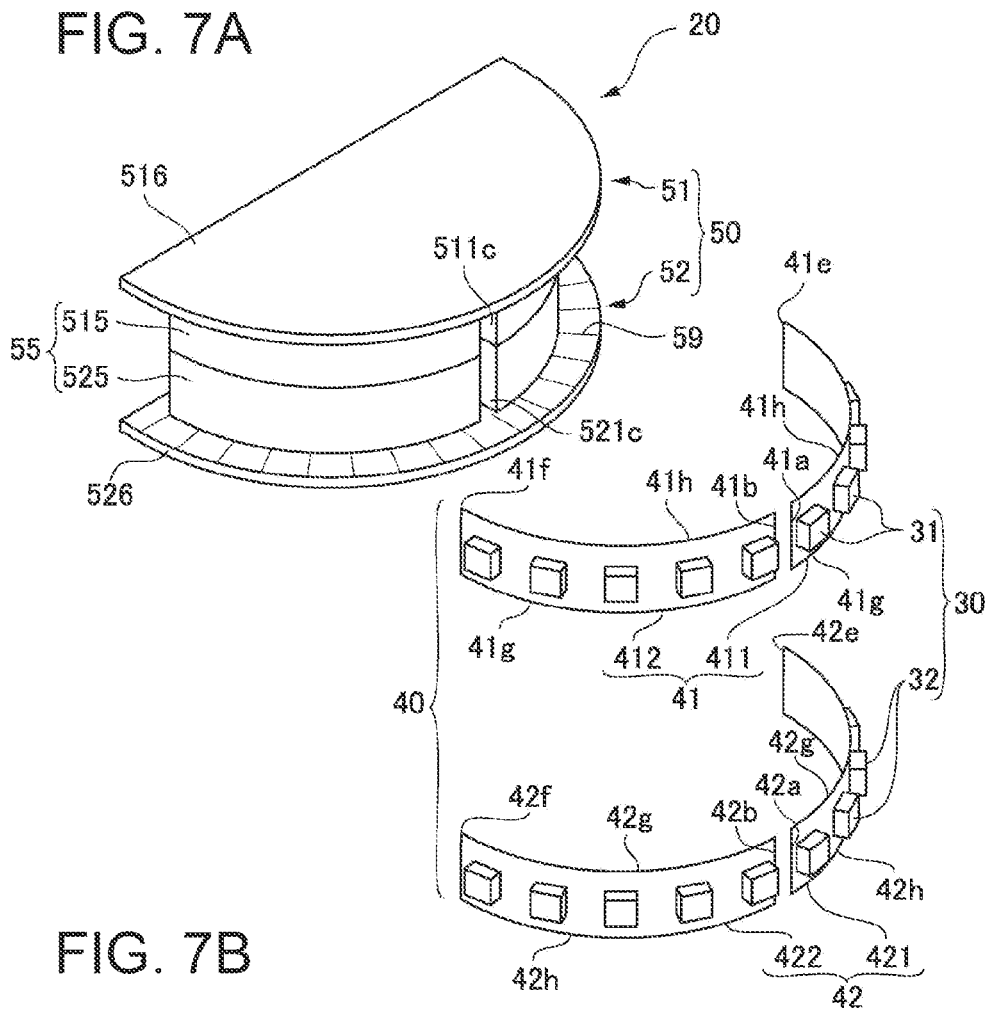
Figure 8:
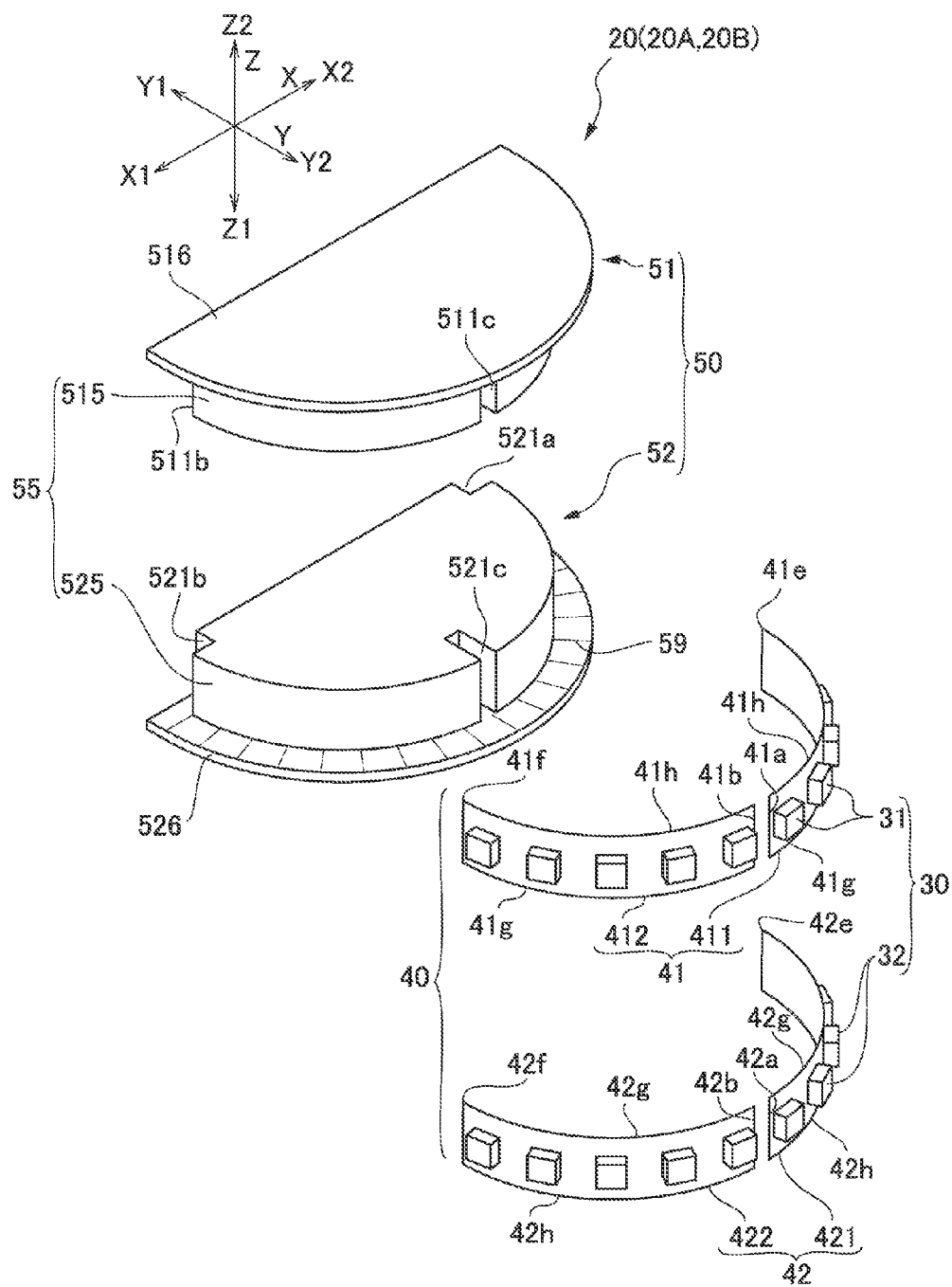
FIG. 8 is an exploded perspective view acquired by disassembling the light source unit of the optical position detecting device according to Embodiment 2 of the invention into pieces.
Figure 9A:
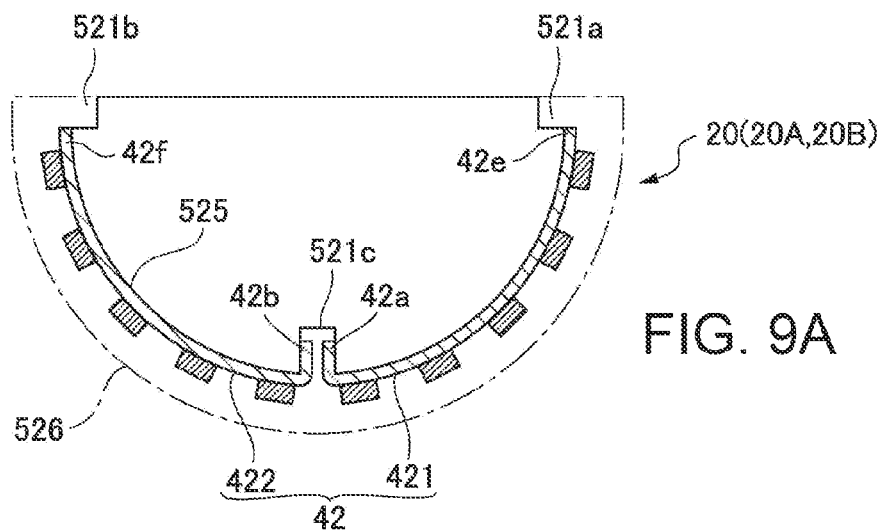
FIGS. 9A to 9C are explanatory diagrams illustrating the appearance of attaching a flexible substrate to a second substrate supporting member in the optical position detecting device according to Embodiment 2 of the invention.
Figure 9B:
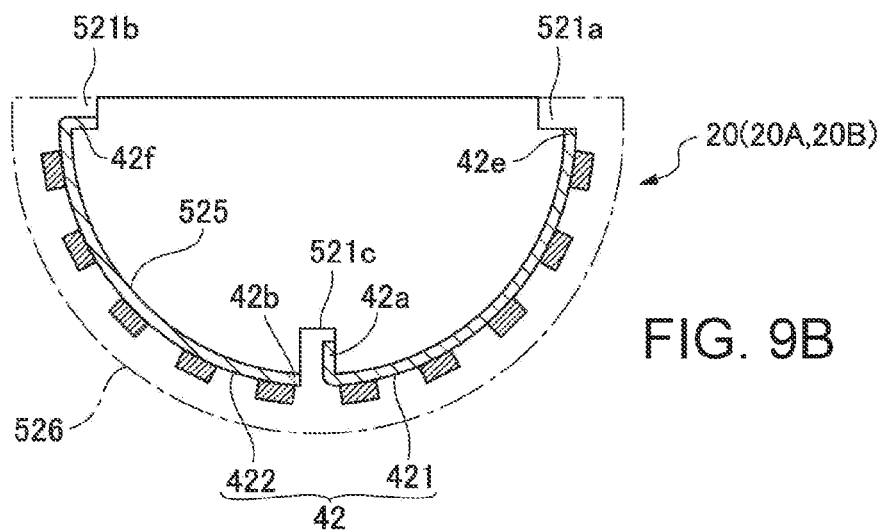
Figure 9C:
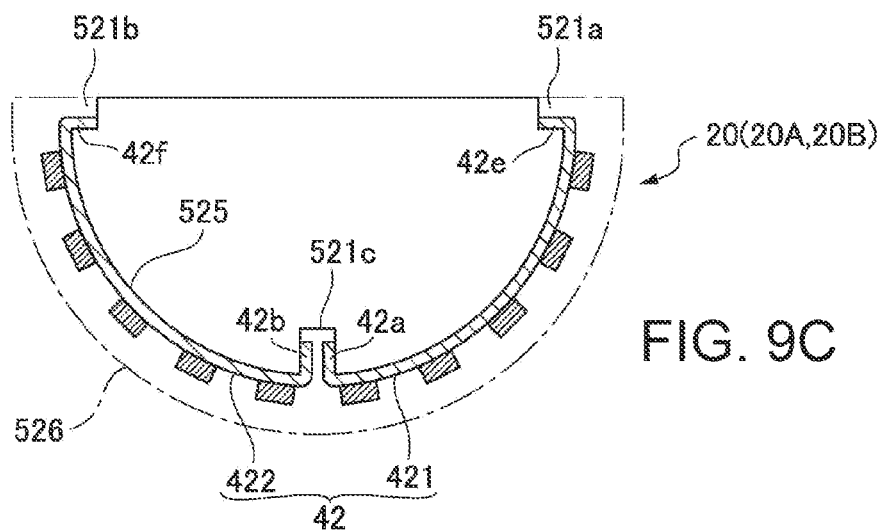

FIGS. 7A and 7B are explanatory diagrams of a light source unit 20 of an optical position detecting device 10 according to Embodiment 2 of the invention. FIGS. 7A and 7B are a perspective view and an exploded perspective view of the light source unit 20. FIG. 8 is an exploded perspective view acquired by disassembling the light source unit 20 of the optical position detecting device 10 according to Embodiment 2 of the invention into pieces. FIGS. 9A to 9C are explanatory diagrams illustrating the appearance of attaching a second flexible substrate 42 to a second substrate supporting member 52 in the optical position detecting device 10 according to Embodiment 2 of the invention. FIGS. 9A, 9B, and 9C are explanatory diagrams illustrating the second flexible substrate 42 positioned in various states. Since the basic configuration of this embodiment is similar to that of Embodiment 1, the same reference signal is assigned to a common portion, and the description thereof is not presented here.

As shown in FIGS. 7A, 7B, and 8, the light source unit 20 used in the optical position detecting device 10 according to this embodiment, similarly to that of Embodiment 1, includes: a plurality of light emitting devices 30; a band-shaped flexible substrate 40 on which the plurality of light emitting devices 30 are mounted; and a substrate supporting member 50 that includes a convex face 55 having a curved shape and extending in the longitudinal direction.

In this embodiment, as the flexible substrates 40, a band-shaped first flexible substrate 41 and a band-shaped second flexible substrate 42 that is in parallel with the first flexible substrate 41 in the width direction are used. Here, the first flexible substrate 41 is divided in the longitudinal direction into two including a flexible substrate 411 and a flexible substrate 412, and the flexible substrates 411 and 412 are arranged in series (in a column). In the flexible substrates 411 and 412, a plurality of first light emitting devices 31 are mounted in the longitudinal direction. The second flexible substrate 42, similarly to the first flexible substrate 41, is divided in the longitudinal direction into two including a flexible substrate 421 and a flexible substrate 422, and the flexible substrates 421 and 422 are arranged in series (in a column) in the longitudinal direction. In the flexible substrates 421 and 422, a plurality of second light emitting devices 32 are mounted in the longitudinal direction.

In correspondence with the configuration of the flexible substrates 40, in a first substrate supporting member 51, notches 511a and 511b are formed in both end portions of a convex face 515 in the circumferential direction, and a notch 511c is formed also on the center of the convex face 515 in the longitudinal direction. In addition, in a second substrate support member 52, similarly to the first substrate supporting member 51, notches 521a and 521b are formed in both end portions of a convex face 525 in the circumferential direction, and a notch 521c is formed also on the center of the convex face 525 in the longitudinal direction. Thus, according to this embodiment, as will be described below with reference to FIG. 9A to 9C, the first flexible substrates 41 (flexible substrates 411 and 412) and the second flexible substrates 42 (flexible substrates 421 and 422) can be appropriately arranged in the longitudinal direction by using the notches 511a, 511b, and 511c, and the notches 521a, 521b, and 521c.

First, in the form shown in FIG. 9A, when the second flexible substrate 42 is arranged on the convex face 525 of the second substrate supporting member 52, one end portion 42e of the flexible substrate 421 is positioned in a boundary portion between the end portion of the convex face 525 and the notch 521a, then, the flexible substrate 421 is arranged so as to overlap the convex face 525, and the flexible substrate 421 and the convex face 525 are fixed by using an adhesive agent or the like. At that time, in a case where the length of the flexible substrate 421 is much larger than the length (the size from the end portion to the notch 511c) of the convex face 525, the other end portion 42a of the flexible substrate 421 is bent so as to be inserted into the notch 521c. Accordingly, differently from a case where one end portion 42e and the other end portion 42a of the flexible substrate 421 are positioned to the convex face 525, inconvenience such as partial floating of the flexible substrate 421 from the convex face 525 does not occur. In addition, in the flexible substrate 422, the other end portion 42f of the flexible substrate 422 is positioned in a boundary portion between the end portion of the convex face 525 and the notch 521b, then, the flexible substrate 422 is arranged so as to overlap the convex face 525, and the flexible substrate 422 and the convex face 525 are fixed by using an adhesive agent or the like. At that time, in a case where the length of the flexible substrate 422 is much larger than the length (the size from the end portion to the notch 511c) of the convex face 525, the one end portion 42b of the flexible substrate 422 is bent so as to be inserted into the notch 521c. Accordingly, differently from a case where one end portion 42b and the other end portion 42f of the flexible substrate 422 are positioned to the convex face 525, inconvenience such as partial floating of the flexible substrate 422 from the convex face 525 does not occur. Therefore, the second light emitting device 32 can be precisely arranged from a predetermined direction toward another predetermined direction. Although not shown in the figure, this may be similarly applied to a case where the first flexible substrates 41 (the flexible substrates 411 and 412) is arranged on the convex face 515.

Next, in a form shown in FIG. 9B, when the second flexible substrate 42 is arranged on the convex face 525 of the second substrate supporting member 52, one end portion 42e of the flexible substrate 421 is positioned in a boundary portion between the end portion of the convex face 525 and the notch 521a, then, the flexible substrate 421 is arranged so as to overlap the convex face 525, and the flexible substrate 421 and the convex face 525 are fixed by using an adhesive agent or the like. At that time, in a case where the length of the flexible substrate 421 is much larger than the length of the convex face 525, the other end portion 42a of the flexible substrate 421 is bent so as to be inserted into the notch 521c. Accordingly, differently from a case where one end portion 42e and the other end portion 42a of the flexible substrate 421 are positioned to the convex face 525, inconvenience such as partial floating of the flexible substrate 421 from the convex face 525 does not occur. In addition, in the flexible substrate 422, one end portion 42b is positioned in a boundary portion between the end portion of the convex face 525 and the notch 521c, then, the flexible substrate 422 is arranged so as to overlap the convex face 525, and the flexible substrate 422 and the convex face 525 are fixed by using an adhesive agent or the like. At that time, in a case where the length of the flexible substrate 422 is much larger than the length of the convex face 525, the other end portion 42f of the flexible substrate 422 is bent so as to be inserted into the notch 521b. Accordingly, differently from a case where one end portion 42b and the other end portion 42f of the flexible substrate 422 are positioned to the convex face 525, inconvenience such as partial floating of the flexible substrate 422 from the convex face 525 does not occur. Furthermore, although not shown in the figure, this similarly applies to a case where the first flexible substrates 41 (the flexible substrates 411 and 412) are arranged on the convex face 515.

Next, in a form shown in FIG. 9C, when the second flexible substrate 42 is arranged on the convex face 525 of the second substrate supporting member 52, the flexible substrate 421 is arranged so as to overlap the convex face 525 with the position of the light emitting device 30 mounted on the flexible substrate 421 used as a reference, and the flexible substrate 421 and the convex face 525 are fixed by using an adhesive agent or the like. At that time, in a case where the length of the flexible substrate 421 is much larger than the length of the convex face 525, one end portion 42e of the flexible substrate 421 is bent so as to be inserted into the notch 521a, and the other end portion 42a of the flexible substrate 421 is bent so as to be inserted into the notch 521c. Accordingly, differently from a case where one end portion 42e and the other end portion 42a of the flexible substrate 421 are positioned to the convex face 525, inconvenience such as partial floating of the flexible substrate 421 from the convex face 525 does not occur. In addition, regarding the flexible substrate 422, the flexible substrate 422 is arranged so as to overlap the convex face 525 with the position of the light emitting device 30 mounted on the flexible substrate 422 used as a reference, and the flexible substrate 422 and the convex face 525 are fixed by using an adhesive agent or the like. At that time, in a case where the length of the flexible substrate 422 is much larger than the length of the convex face 525, one end portion 42b of the flexible substrate 422 is bent so as to be inserted into the notch 521c, and the other end portion 42f of the flexible substrate 422 is bent so as to be inserted into the notch 521b. Accordingly, differently from a case where one end portion 42b and the other end portion 42f of the flexible substrate 422 are positioned to the convex face 525, inconvenience such as partial floating of the flexible substrate 422 from the convex face 525 does not occur. Furthermore, although not shown in the figure, this similarly applies to a case where the first flexible substrates 41 (the flexible substrates 411 and 412) are arranged on the convex face 515.

Embodiment 3

Figure 10A:
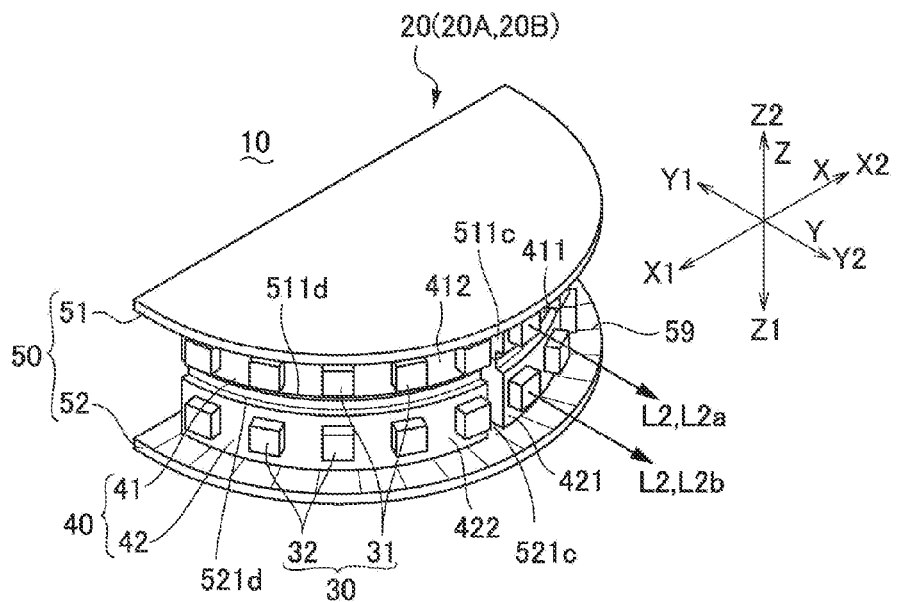
FIGS. 10A and 10B are explanatory diagrams of a light source unit of an optical position detecting device according to Embodiment 3 of the invention.
Figure 10B:
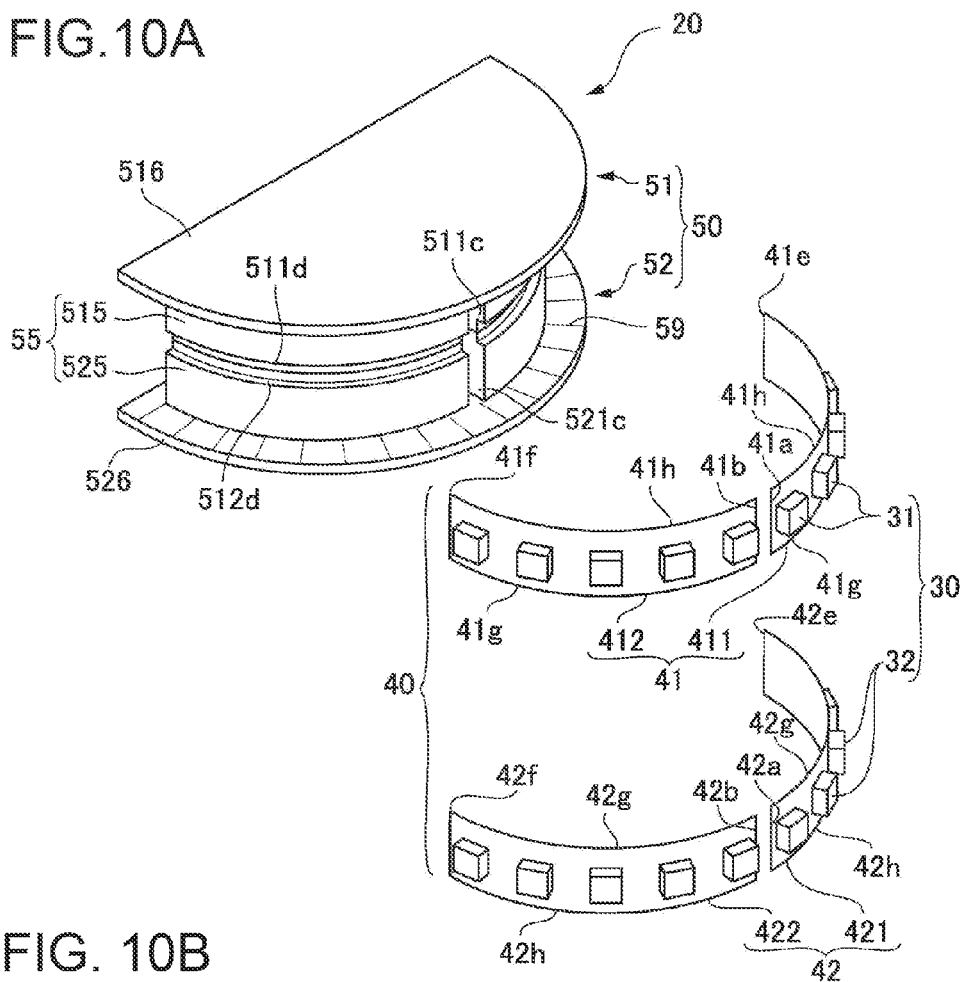

FIGS. 10A and 10B are explanatory diagrams of a light source unit 20 of an optical position detecting device 10 according to Embodiment 3 of the invention. FIGS. 10A and 10B are a perspective view and an exploded perspective view of the light source unit 20. FIGS. 11A and 11B are explanatory diagrams showing the detailed configuration of the light source unit 20 of the optical position detecting device 10 according to Embodiment 3 of the invention. FIGS. 11A and 11B are an exploded perspective view of the light source unit 20 that is further exploded and a cross-sectional view of a main portion thereof. Since the basic configuration of this embodiment is similar to that of Embodiment 1, the same reference signal is assigned to a common portion, and the description thereof is not presented here.

As shown in FIGS. 10A, 10B, and 11, the light source unit 20 used in the optical position detecting device 10 according to this embodiment, similarly to those of Embodiments 1 and 2, includes: a plurality of light emitting devices 30; a band-shaped flexible substrate 40 on which the plurality of light emitting devices 30 are mounted; and a substrate supporting member 50 that includes a convex face 55 having a curved shape and extending in the longitudinal direction. In this embodiment, as the flexible substrates 40, a band-shaped first flexible substrate 41 and a band-shaped second flexible substrate 42 that is in parallel with the first flexible substrate 41 in the width direction are used. Here, the first flexible substrate 41 is divided in the longitudinal direction into two including a flexible substrate 411 and a flexible substrate 412, and the flexible substrates 411 and 412 are arranged in series (in a column) in the longitudinal direction. In the flexible substrates 411 and 412, a plurality of first light emitting devices 31 are mounted in the longitudinal direction. The second flexible substrate 42, similarly to the first flexible substrate 41, is divided in the longitudinal direction into two including a flexible substrate 421 and a flexible substrate 422, and the flexible substrates 421 and 422 are arranged in series (in a column) in the longitudinal direction. In the flexible substrates 421 and 422, a plurality of second light emitting devices 32 are mounted in the longitudinal direction.

In correspondence with such a configuration, in a first substrate supporting member 51, notches 511a and 511b are formed in both end portions of a convex face 515 in the circumferential direction, and a notch 511c is formed also on the center of the convex face 515 in the longitudinal direction. In addition, in a second substrate supporting member 52, similarly to the first substrate supporting member 51, notches 521a and 521b are formed in both end portions of a convex face 525 in the circumferential direction, and a notch 521c is formed also on the center of the convex face 525 in the longitudinal direction. Thus, according to this embodiment, as described in Embodiment 2 with reference to FIG. 9A to 9C, a variation in the sizes of the first flexible substrates 41 (flexible substrates 411 and 412) and the second flexible substrates 42 (flexible substrates 421 and 422) in the longitudinal direction can be absorbed.

In addition, according to this embodiment, in the first substrate supporting member 51, a notch 511d is formed at a position overlapping one end portion 41g of the first flexible substrate 41 in the width direction. In addition, in the second substrate supporting member 52, a notch 521d is formed at a position overlapping one end portion 42g of the second flexible substrate 42 in the width direction. Accordingly, when the first substrate supporting member 51 and the second substrate supporting member 52 overlap each other, a slit-shaped concave portion is formed between the convex face 515 and the convex face 525 by the notches 511d and 521d.

Thus, according to this embodiment, as described in Embodiment 2 with reference to FIGS. 9A to 9C, the first flexible substrate 41 and the second flexible substrate 42 can be appropriately arranged in the longitudinal direction by using the notches 511a, 511b, and 511c and the notches 521a, 521b, and 521c. In addition, as described below, the first flexible substrate 41 and the second flexible substrate 42 can be appropriately arranged in the width direction by using the notches 511*d* and 521*d*. In other words, when the first flexible substrate 41 is positioned in the width direction of the flexible substrates 421 and 422 by bringing the other end portions 42*h* thereof in the width direction of the flexible substrates 421 and 422 into contact with the flange portion 526, in a case where the sizes of the widths of the flexible substrates 421 and 422 are much larger than the size of the width of the convex face 525, one end portions 42*g* of the flexible substrates 421 and 422 are bent so as to be inserted into the notches 521*d*. Accordingly, even there is a variation in the sizes of the second flexible substrates 42 in the width direction, inconvenience such as partial floating of the flexible substrate 422 from the convex face 525 does not occur. Therefore, the second light emitting device 32 can be precisely arranged from a predetermined direction toward another predetermined direction. This can be similarly applied to the second flexible substrate 42, although the description thereof is not presented here.

In addition, in this embodiment, although the notches 511*d* and 521*d* are added to the configuration described in Embodiment 2, the notches 511*d* and 521*d* may be added to the configuration described in Embodiment 1.

Other Embodiments

In the above-described embodiments, a configuration is employed in which two flexible substrates 40 are arranged in parallel with each other. However, the invention may be applied to a case where the light emitting devices 30 are arranged on one flexible substrate 40 in two rows. In addition, in the above-described embodiments, a configuration is employed in which the first light emitting devices 31 are turned on during the first period, and the second light emitting devices 32 are turned on during the second period. However, a configuration may be employed in which common light emitting devices 30 are turned on during the first and second periods. In such a case, by changing driving currents supplied to the light emitting devices 30 during the first and second periods, the first light intensity distribution L2Xa and the second light intensity distribution L2Xb can be formed.

Configuration of Apparatus Provided With Position Detecting Function

The optical position detecting device 10 described with reference to FIGS. 1 to 11B can be used for configuring an apparatus provided with a position detecting function or the like, and, by emitting the detection light L2 along a visible face of a member configuring the visible face, the position of a target object Ob located on the visible face side can be detected. As examples of such an apparatus provided with a position detecting function, there are a screen apparatus provided with a position detecting function to be described with reference to FIGS. 12A and 12B, a projection-type display apparatus provided with a position detecting function to be described with reference to FIGS. 13A and 13B, digital signage provided with a position detecting function, an amusement apparatus provided with a position detecting function, and the like.

Configuration Example 1 of Apparatus Provided With Position Detecting Function

Figure 12A:
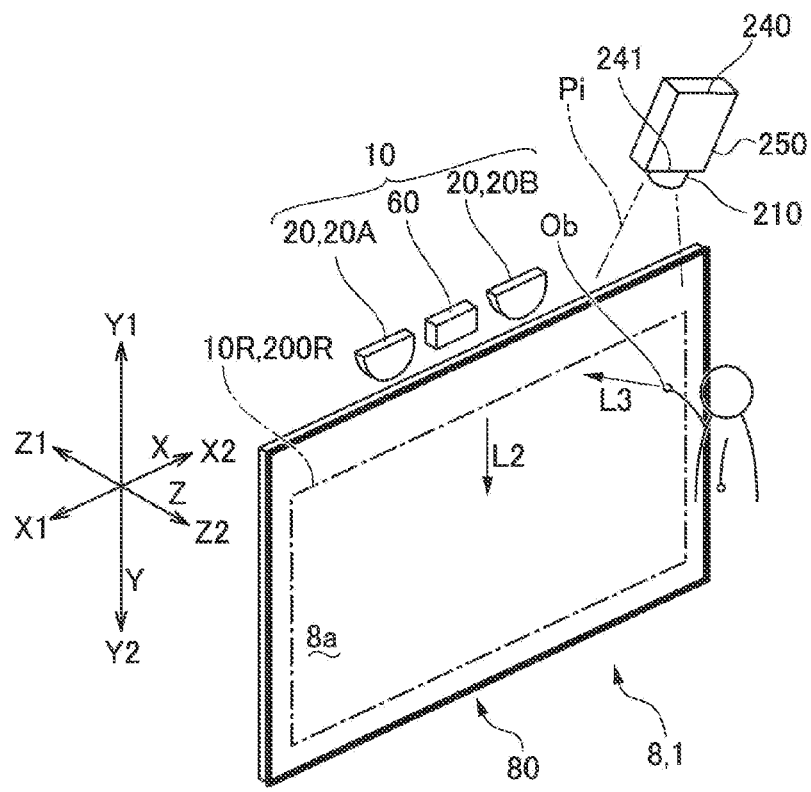
FIGS. 12A and 12B are explanatory diagrams of a screen apparatus provided with a position detecting function (an apparatus provided with a position detecting function) to which an embodiment of the invention is applied.
Figure 12B:
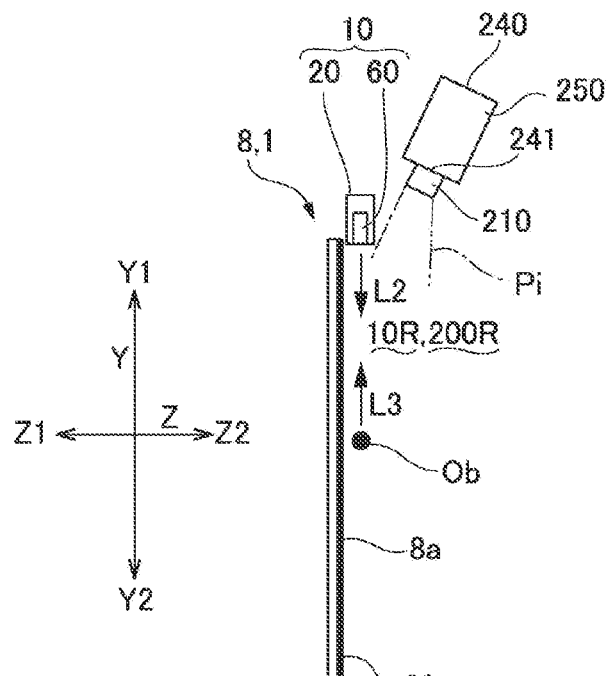

An example will be described with reference to FIGS. 12A and 12B in which a screen apparatus provided with a position detecting function is configured as the apparatus provided with a position detecting function. FIGS. 12A and 12B are explanatory diagrams of a screen apparatus provided with a position detecting function (an apparatus provided with a position detecting function) to which the invention is applied. FIGS. 12A and 12B are an explanatory diagram schematically showing the appearance of the screen apparatus provided with a position detecting function viewed from above the slope thereof and an explanatory diagram schematically illustrating the appearance thereof viewed from the side. Here, since the configuration of the optical position detecting device 10 of the screen apparatus provided with a position detecting function according to this embodiment is similar to that described with reference to FIGS. 1 to 11B, the description thereof is not presented here.

The screen apparatus 8 provided with a position detecting function (the apparatus 1 provided with a position detecting function) shown in FIGS. 12A and 12B includes a screen 80 (member configuring a visible face) onto which an image is projected from an image projecting device 250 (image generating device) called a liquid crystal projector or a digital micro mirror device and the optical position detecting device 10 described with reference to FIGS. 1 to 11B. The image projecting device 250 projects image display light Pi in an enlarged scale from a projection lens system 210 disposed on a front face portion 241 of a casing 240 toward the screen apparatus 8. Accordingly, in the screen apparatus 8 provided with a position detecting function, the visible face on which information can be visually recognized is configured by a screen face 8*a* of the screen 80 onto which an image is projected. Here, the optical position detecting device 10 is arranged on the side of the screen face 8*a* (visible face) of the screen 80 (member configuring visible face) and emits the detection light L2 onto the screen face 8*a*.

In the screen apparatus 8 provided with a position detecting function, which is configured as above, the detection target space 10R overlaps an area (the image displaying region 200R) onto which an image is projected by the image projecting device 250 when viewed in the direction of the normal line of the screen 80. Accordingly, in the projection-type display apparatus 200 provided with a position detecting function, for example, when a target object Ob such as a fingertip approaches a part of the image, for example, projected on the screen 80, the position of the target object Ob can be used as input information such as an instruction for switching between images.

In addition, in this embodiment, although the screen apparatus used for a projection-type display to which an image is projected from the image projecting device 250 has been described as the screen apparatus 8 provided with a position detecting function, a screen apparatus provided with a position detecting function used for an electronic blackboard may be configured by arranging the optical position detecting device 10 on a screen used for the electronic blackboard.

Configuration Example 2 of Apparatus Provided With Position Detecting Function

Figure 13A:
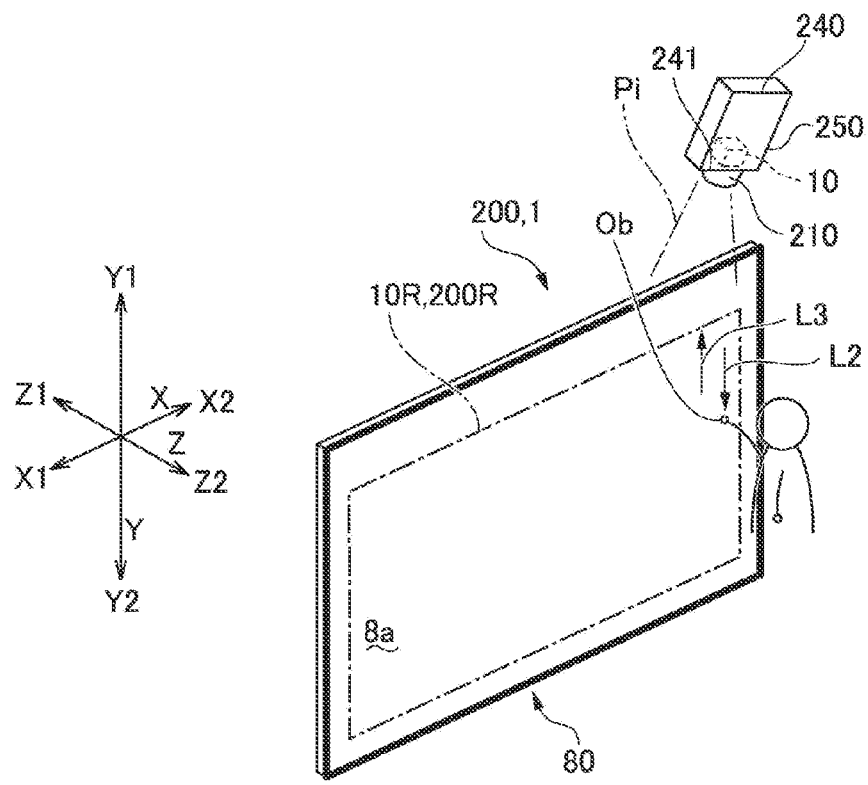
FIGS. 13A and 13B are explanatory diagrams of a projection-type display apparatus provided with a position detecting function (an apparatus provided with a position detecting function) to which an embodiment of the invention is applied.
Figure 13B:
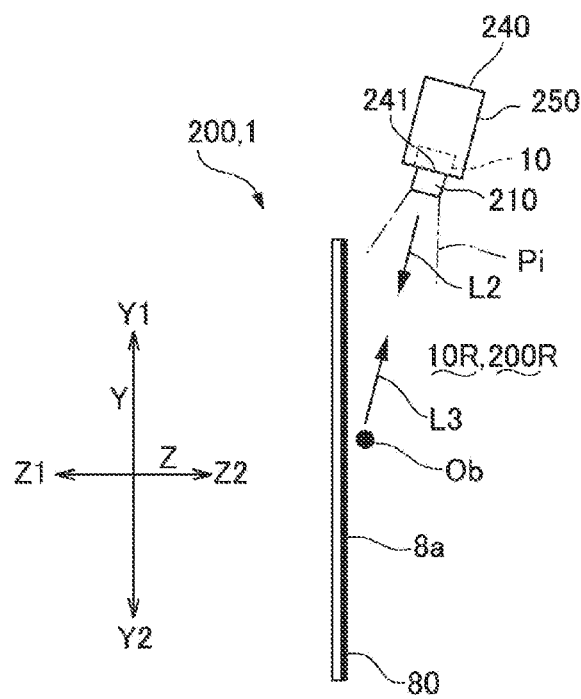

An example will be described with reference to FIGS. 13A and 13B in which a projection-type display apparatus provided with a position detecting function is configured as the apparatus provided with a position detecting function. FIGS. 13A and 13B are explanatory diagrams of a projection-type display apparatus provided with a position detecting function (an apparatus provided with a position detecting function) to which the invention is applied. FIGS. 13A and 13B are an explanatory diagram schematically showing the appearance of the projection-type display apparatus provided with a position detecting function viewed from above the slope thereof and an explanatory diagram schematically illustrating the appearance thereof viewed from the side. Here, since the configuration of the optical position detecting device 10 of the projection-type display apparatus provided with a position detecting function according to this embodiment is similar to that described with reference to FIGS. 1 to 11B, the same reference numeral is assigned to a common portion, and the description thereof is not presented here.

The projection-type display apparatus 200 provided with a position detecting function (the apparatus 1 provided with a position detecting function) shown in FIGS. 13A and 13B includes an image projecting device 250 (image generating device) called a liquid crystal projector or a digital micro mirror device and the optical position detecting device 10 described with reference to FIGS. 1 to 11B. The image projecting device 250 projects image display light Pi in an enlarged scale from a projection lens system 210 disposed on a front face portion 201 of a casing 240 toward a screen 80. In the projection-type display apparatus 200 provided with a position detecting function, a visible face on which information can be visually recognized is configured by a screen face 8a of the screen 80 onto which an image is projected.

In the projection-type display apparatus 200 provided with a position detecting function, the optical position detecting device 10 is mounted on the image projecting device 250 that is arranged on the side of the screen face 8a (visible face) of the screen 80. Accordingly, the optical position detecting device 10 emits detection light L2 along the screen face 8a (visible face) of the screen 80 (a member configuring the visible face) from the image projecting device 250. In addition, the optical position detecting device 10 detects detection light L3 reflected by a target object Ob in the image projecting device 250.

In the screen apparatus 8 provided with a position detecting function, which is configured as above, the detection target space 10R overlaps an area (the image displaying region 200R) onto which an image is projected by the image projecting device 250 when viewed in the direction of the normal line of the screen 80. Accordingly, in the projection-type display apparatus 200 provided with a position detecting function, for example, when an object Ob such as a fingertip approaches a part of the image, for example, projected on the screen 80, the position of the target object Ob can be used as input information such as an instruction for switching between images.

The entire disclosure of Japanese Patent Application No. 2010-257565, filed Nov. 18, 2010 is expressly incorporated by reference herein.

What is claimed is:

1. An optical position detecting device that optically detects a position of a target object, the optical position detecting device comprising:
   a light source unit that emits detection light;
   a light receiving unit that receives the detection light reflected by the target object that is located in an emission space of the detection light; and
   a position detecting unit that detects the position of the target object in the emission space based on a result of the reception of the light in the light receiving unit,
   wherein the light source unit includes a plurality of light emitting devices, a band-shaped flexible substrate on which the plurality of light emitting devices are mounted, and a substrate supporting member that includes a convex face bent in a longitudinal direction on which the flexible substrate is arranged so as to overlap, and
   wherein a notch, which is concaved from the convex face at a position overlapping an end portion of the flexible substrate and into which the end portion of the flexible substrate is inserted, is disposed in the substrate supporting member, and an emission intensity monotonously changes from one end of the convex face in the longitudinal direction toward the other end side when the detection light is emitted from the light source units.

2. The optical position detecting device according to claim 1,
   wherein a band-shaped first flexible substrate and a band-shaped second flexible substrate that is arranged in parallel with the first flexible substrate in a width direction of the first flexible substrate are included as the flexible substrate,
   wherein the plurality of light emitting devices mounted on the first flexible substrate and the plurality of light emitting devices mounted on the second flexible substrate are turned on at different timings,
   wherein the emission intensity increases from the one end of the convex face in the longitudinal direction toward the other end side in the plurality of light emitting devices mounted on the first flexible substrate, and
   wherein the emission intensity decreases from the one end of the convex face in the longitudinal direction toward the other end side in the plurality of light emitting devices mounted on the second flexible substrate.

3. The optical position detecting device according to claim 1, wherein the notch is concaved from the convex face at a position overlapping the end portion of the flexible substrate in a longitudinal direction and into which the end portion of the flexible substrate in the longitudinal direction is inserted.

4. The optical position detecting device according to claim 3, wherein the notch is disposed in the end portion of the convex face in the longitudinal direction.

5. The optical position detecting device according to claim 4,
   wherein a plurality of the flexible substrates are arranged in series in the longitudinal direction of the convex face, and
   wherein the notch is disposed at a position in the middle of the convex face in the longitudinal direction.

6. The optical position detecting device according to claim 1, wherein the notch is concaved from the convex face at a position overlapping an one end portion of the flexible substrate in a width direction and into which the one end portion of the flexible substrate is inserted.

7. The optical position detecting device according to claim 1, wherein a flange portion, which protrudes from the convex face and with which the other end portion of the flexible substrate in a width direction is brought into contact, is disposed in the substrate supporting member.

8. An apparatus provided with a position detecting function, the apparatus comprising the optical position detecting device according to claim 1.

9. An apparatus provided with a position detecting function, the apparatus comprising the optical position detecting device according to claim 2.

10. An apparatus provided with a position detecting function, the apparatus s comprising the optical position detecting device according to claim 3.

11. An apparatus provided with a position detecting function, the apparatus comprising the optical position detecting device according to claim 4.

12. An apparatus provided with a position detecting function, the apparatus comprising the optical position detecting device according to claim 5.

13. An apparatus provided with a position detecting function, the apparatus comprising the optical position detecting device according to claim 6.

14. An apparatus provided with a position detecting function, the apparatus comprising the optical position detecting device according to claim 7.

\* \* \* \* \*